March 16, 1965   V. B. HOSTETLER ETAL   3,173,840
SEPARATION-RESISTANT CAPSULE
Filed April 30, 1962   2 Sheets-Sheet 1
Fig. 1A.
A. DIP
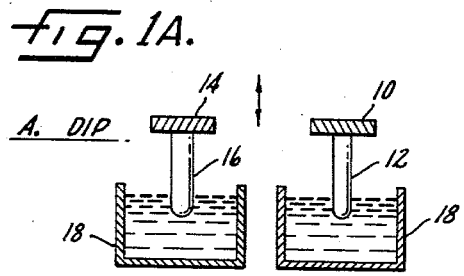
B. DRY
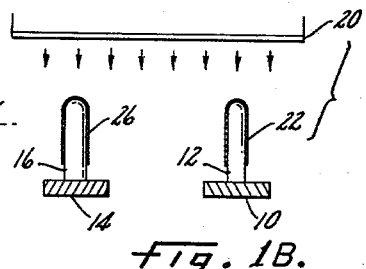
Fig. 1B.
C. STRIP
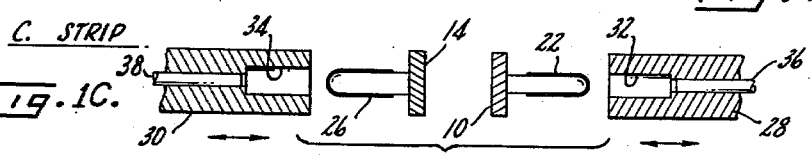
Fig. 1C.
D. CUT
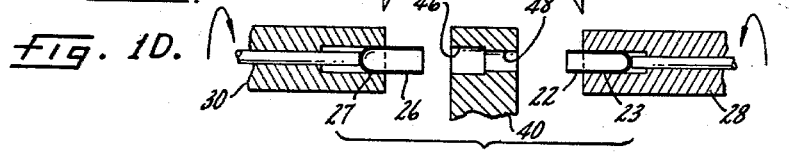
Fig. 1D.
E. JOIN
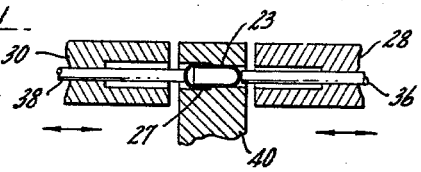
Fig. 1E.
Fig. 2A.
A. FEED AND SEPARATE
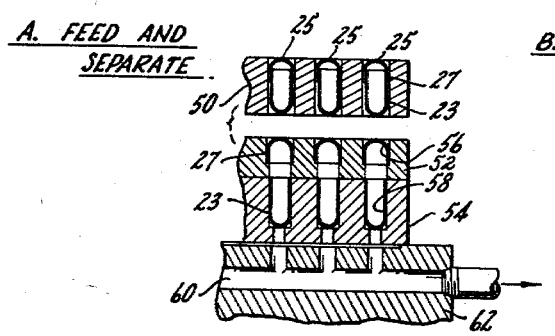
B. FILL
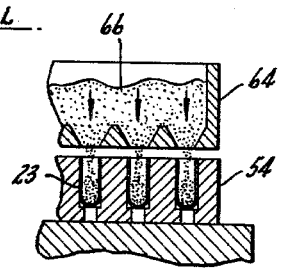
Fig. 2B.
C. JOIN
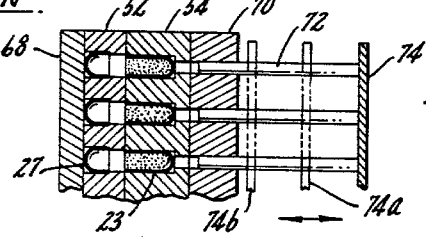
Fig. 2C.
INVENTORS
VAN B. HOSTETLER
IVY LOGSDON, JR.
BY
*Trask, Jenkins & Hanley*
ATTORNEYS.

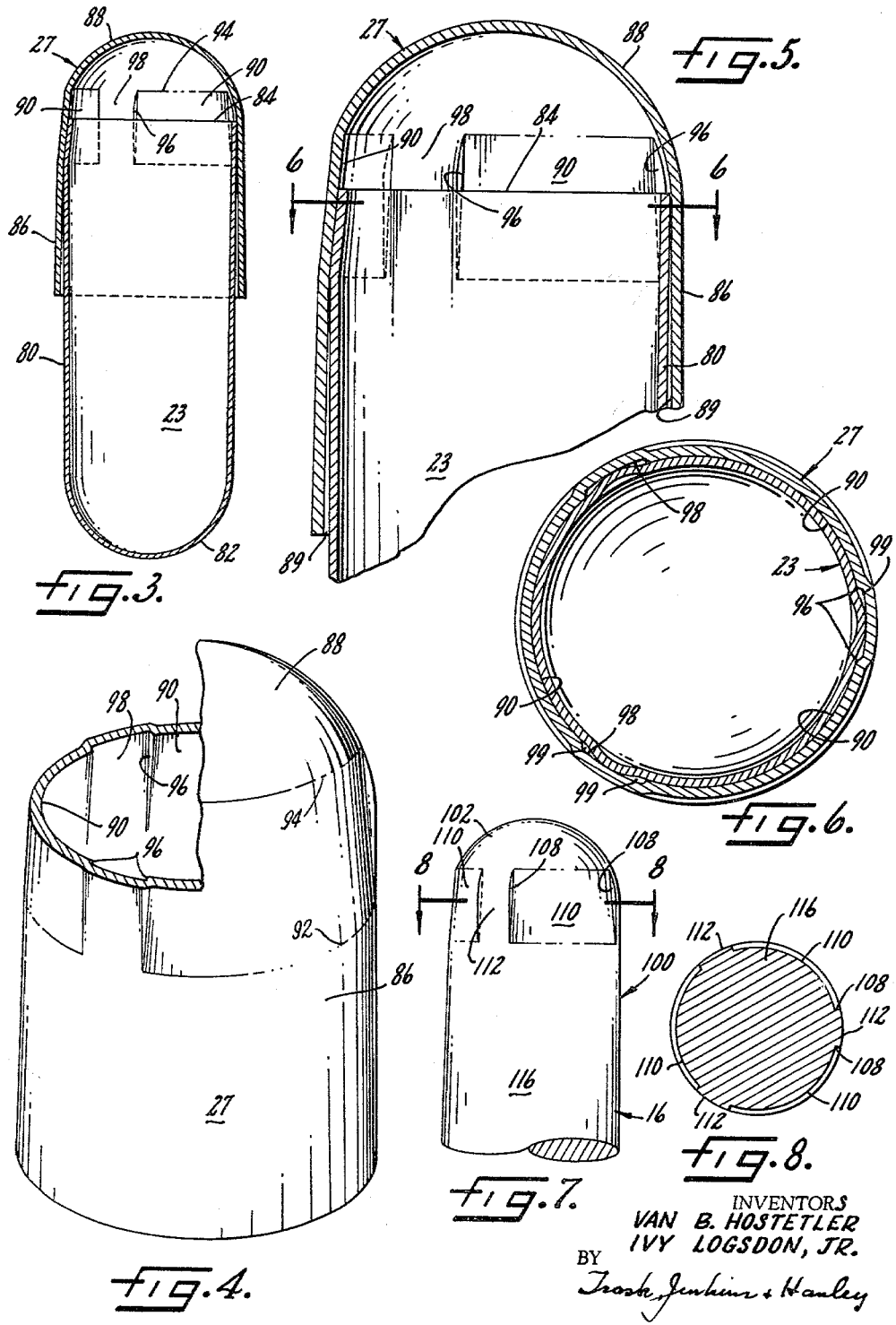

though the pressure, so that the caps and bodies of assembled capsules embodying the invention do not tend to be driven apart by compressed air contained between them. Second, the wide tapered lands within the cap have a wedging interference relationship with the open-end portion of the body as the body approaches its fully assembled position relative to the cap. The cap and body thus interengage with a wedging action, which tends to maintain them in assembled relation. However, and third, the wedging action is not continuous about the entire circumference of the capsule, since the tapered lands are not circumferentially continuous but are separated by intervening shallow grooves of substantial width. In consequence, as the wedging action takes place in the land areas, the body wall in the groove areas can bulge outward into the shallow grooves, in a manner controlled by the depth and width of the grooves. A controlled distortion occurs in the open-end portion of the body, and probably also in the surrounding portion of the cap, which relieves and gives a yielding resilience to the wedging action. This, on the one hand, prevents a complete

United States Patent Office 3,173,840
Patented Mar. 16, 1965

3,173,840
SEPARATION-RESISTANT CAPSULE
Van B. Hostetler, Lawrence Township, Marion County, and Ivy Logsdon, Jr., Perry Township, Marion County, Ind., assignors to Eli Lilly and Company, Indianapolis, Ind., a corporation of Indiana
Filed Apr. 30, 1962, Ser. No. 191,152
15 Claims. (Cl. 167—83)

This invention relates to capsules of the type used to enclose medicinal powders and pellets and various other things, which capsules commonly consist of a tubular body and a tubular cap telescopically received on the body, and are commonly made by dip-molding gelatin or like material.

It is the principal object of the invention to provide a separation resistant capsule in which the body and cap will stay together more securely than in prior capsules. It is a further object of the invention to provide separation-resistant capsules which are adapted to be made on conventional high-production equipment, and to require a minimum amount of change in such equipment; which are adapted to be assembled empty without trapping compressed air therein and will resist separation during handling and shipping as empty capsules; which capsules are also readily adapted to be filled on conventional filling equipment, and permit their caps and bodies to be readily separated for filling by the conventional separating means of such equipment and, after filling to be re-joined by the conventional mechanism of such equipment, and which capsules when so filled and rejoined will stay securely together. It is a further object of the invention to provide capsules which, by relative adjustment of the joining mechanisms of the manufacturing and filling equipment, can be made to stay together more securely when filled than when empty.

The capsule bodies are generally tubular with an open-end portion defined by a generally cylindrical but slightly diverging wall, the opposite end of the body is closed, and the intermediate wall may be generally cylindrical, markedly conical, or of other special or desired configuration. The capsule caps are tubular with a generally cylindrical but slightly tapered side wall merging at a junction plane with a rounded end wall which closes one end of the cap. The rounded end may be either of compound curvature or hemispherical. The present invention is not concerned with the specific shape of the capsule body, except that the body have a generally cylindrical open-end portion, and it is applicable to caps having ends of either compound curvature or the hemispherical form here shown for convenience of illustration.

In accordance with the invention, the capsule cap portion or band which telescopically receives, surrounds, and engages the open-end portion of the capsule body is provided with a plurality of inwardly raised lands circumferentially separated by shallow inwardly-open depressions or grooves. The grooves may be defined by portions of the generally cylindrical side wall of the cap and adjoining portions of the rounded end of the cap. The land surfaces are desirably surfaces of revolution and are preferably formed as conical surfaces coaxial with the cap and extending from a line of merger with the generally cylindrical side wall of the cap, across the junction plane between such side wall and the rounded end of the cap, and to a line of merger with the rounded end of the cap. The tapered lands will thus be positioned to be wedged against by the open-end portion of the body when such body is thrust to assembled position telescopically into the cap.

The lands may be considered to constitute a tapered seat which wedgingly receives the open end of the body, with the seat interrupted at circumferentially spaced areas by longitudinal grooves. Desirably, the taper of the seat is relatively small, say of the order of from 0.1 to 0.2 inch reduction on the diameter per inch of length, and the height of the lands is also relatively small, say of the order of 0.002 inch in a size "5" capsule to 0.005 inch in a size "0" capsule.

The lands preferably occupy a major portion, and desirably at least 60%, of the circumference of the cap in the junction plane between the generally cylindrical side-wall of the cap and the rounded end wall. On the other hand, the lands should occupy less than the full circumference, and preferably not more than about 85% of the circumference. Desirably, each land has a circumferential width of at least about 70°, each groove has a circumferential width of the order of from 20° to 40°, and the grooves and lands are symmetrically arranged about the axis of the cap. In a preferred embodiment of the invention, the cap has three tapered lands separated by three grooves, with the lands each extending about 90° and the grooves each about 30° circumferentially of the cap.

Capsules made in accordance with the invention as set forth above have been found to accomplish the stated objects of the invention. While it is difficult to be certain of the theory upon which these results are obtained, especially because of the smallness of the parts, it may be helpful to an understanding of the invention to mention three factors which appear to play an important part. First, during assembly of the cap and body of a capsule, either empty or filled, the body tends to act as a piston in the cylindrical side-wall of the cap, and to trap and compress air within the assembled capsule. In capsules of the present invention, it is believed that the inwardly open grooves between the tapered lands of the cap serve to vent this compressed air and to dissipate the pressure, so that the caps and bodies of assembled capsules embodying the invention do not tend to be driven apart by compressed air contained between them. Second, the wide tapered lands within the cap have a wedging interference relationship with the open-end portion of the body as the body approaches its fully assembled position relative to the cap. The cap and body thus interengage with a wedging action, which tends to maintain them in assembled relation. However, and third, the wedging action is not continuous about the entire circumference of the capsule, since the tapered lands are not circumferentially continuous but are separated by intervening shallow grooves of substantial width. In consequence, as the wedging action takes place in the land areas, the body wall in the groove areas can bulge outward into the shallow grooves, in a manner controlled by the depth and width of the grooves. A controlled distortion occurs in the open-end portion of the body, and probably also in the surrounding portion of the cap, which relieves and gives a yielding resilience to the wedging action. This, on the one hand, prevents a complete locking action and, on the other hand, improves and extends the holding action so that it is continuously maintained over a substantial tolerance range and in spite of shrinkage or other dimensional changes. The capsules reliably resist separation, yet the caps and bodies of the capsules are not so interlocked as to prevent their separation in conventional filling equipment. Further, by controlling the extent to which the caps and bodies are wedged together, the holding action can be regulated, and empty capsules can be given a moderate holding action to permit their ready separation for filling, while filled capsules can be thrust together more firmly and thus given a much stronger resistance to separation.

The accompanying drawings illustrate the invention. In such drawings:

FIG. 1 is a schematic diagram illustrating the successive steps of making capsules;

FIG. 2 is a schematic diagram showing the major steps of filling capsules;

FIG. 3 is a longitudinal section, on an enlarged scale, of a capsule embodying the invention;

FIG. 4 is a perspective view of a capsule cap with a portion of its upper end shown in section;

FIG. 5 is a partial longitudinal section, on a further enlarged scale, of the capsule shown in FIG 3;

FIG. 6 is a horizontal section taken on the line 6—6 of FIG. 5;

FIG. 7 is a side elevation of a pin used in the production of caps in accordance with the invention; and FIG. 8 is a radial section taken on the line 8—8 of FIG. 7.

In the method of making capsules illustrated in FIG. 1, in step A a plurality of capsule body pins 12 on a bar 10 and a corresponding number of capsule cap pins 16 on a bar 14 are dipped into tanks 18 of liquid gelatin to a predetermined depth, and then withdrawn. In step B, the resultant coating of gelatin on pins 12 and 16 is partially or wholly dried on the pins, as by flowing air thereover from an air chamber 20. This forms a capsule body shell 22 on the body pin 12 and a capsule cap shell 26 on the cap pin 16.

The bars 10 and 14 carrying shells 22 and 26 on their pins are then positioned between groups of stripping collets 28 and 30, for stripping in step C. The collets 28 and 30 traverse inward to receive the shells 22 and 26 in cavities 32 and 34 of the collets, to a depth regulated by the movement of the collets and by the positioning of plungers 36 and 38 in the collets. With the collets advanced, gripping means (not shown) in the collets engages the shells 22 and 26 to retain them in the cavities, and the collets then retract and strip the shells 22 and 26 from their pins.

The bars 10 and 14 are then removed and a capsule assembly carrier 40 is positioned between the collets. In cutting step D, the collets 28 and 30 are rotated, and knives 42 and 44 are brought downward to trim the shells to proper length. This leaves a capsule body 23 in the collet 28 and a capsule cap 27 in the collet 30. The knives are then withdrawn and collet rotation stopped.

The capsule assembly carrier 40 contains shouldered apertures, each including a large bore 46 to receive a capsule cap, and a small guide bore 48 to receive and guide a capsule body. In the joining step E, the collets 28 and 30 are advanced toward the carrier 40 and aligned with an aperture 46–48, and the plungers 38 and 36 are advanced in sequence, to push the cap 27 from the collet 30 into the large bore 46 and against the shoulder at its inner end, and to push the capsule body 23 from the collet 28 into and through the guide bore 48 into telescopic assembly with the cap 27. The assembled empty capsule in the aperture 46–48 is then discharged by retracting the collet 30 and further advancing the plungers 36.

Attention is called to certain features of this process of making capsules. It is essential for the shells 22 and 26 to strip freely from the pins 12 and 16 on which they are formed. To this end, the pins 12 and 16 have a slight taper or draft, which may be of the order of 0.010 to 0.020 inch per inch, that is such that the diameter of the pin is reduced by from 0.010 to 0.020 inch for each inch of pin length. The pin surfaces must converge continuously toward the outer ends of the pins and there can be no undercut or divergent portions which would interfere with free stripping of the shells from the pins.

Capsule caps and bodies are necessarily joined in the capsule-making machine, for it is not practical to handle caps and bodies separately. Unless the caps and bodies are assembled and allowed to normalize in assembled relation, the open ends of the caps and bodies become warped and distorted and it is impossible to assemble them into capsules. On the other hand, the caps and bodies of empty capsules must not be so tightly interengaged that they can not be readily separated for filling.

Conventional filling is illustrated in FIG. 2. Empty capsules 25 in assembled state are fed from a conventional feeding unit 50 to a superimposed pair of plates 52 and 54. The upper or cap plate 52 contains a plurality of shouldered openings 56 having upper bore portions, to receive and retain capsule caps 27, and smaller bore portions to pass capsule bodies 23. The body plate 54 contains shouldered openings aligned with the openings 56, each of which forms a socket 58 for a capsule body 23 and has a vent of reduced diameter for connection to a suction passage 60 in a supporting plate 62. The body sockets 58 have a depth to position the bodies 23 with their open upper ends flush with the top surface of the body plate 54.

Capsules 25 fed from the unit 50 enter the openings 56 of the plates 52 with the body ends of the capsules 25 downward, the caps 27 of the capsules are retained in the cap plate 52 and the suction from the passages 60 pulls the bodies 23 downward to separate them from the caps and seat them in the sockets 58 in the body plate 54.

The body 54 containing the bodies 23 is then placed beneath a filling unit 64 diagrammatically indicated in step B of FIG. 2, the bodies are filled with material 66, and the filled material is leveled off flush with the top ends of the bodies 23. The body plate 54 containing the filled capsule bodies 23 is then reassembled with the cap plate 52, as shown in step C of FIG. 2, with the openings of the two plates aligned and with a backing plate 68 positioned to retain the caps 27 in the cap plate 52. The caps and filled bodies contained in the plates 52 and 54 are then joined by a joining unit 70 positioned against the body plate 54. A plurality of plungers 72 carried by a bar 74 are moved forward (to the left in FIG. 2) to a first position 74a, to thrust the bodies 23 from the plate 54 into their caps 27 in the cap plate 52. The backing plate 68 is then removed, and the bar 74 is advanced further to position 74b, which advances the plungers 72, to eject the filled and now re-assembled capsules from the plates 52 and 54. The ejected filled and joined capsules are collected for such finishing and packaging steps as may be desired.

In the filling operation, caps and bodies of assembled empty capsules must be readily separable by practical means, as by the vacuum separation shown. The caps and bodies must not be interlocked and must not be injured or damaged by the separation and reassembly. Moreover, the capsule bodies 23 presented for filling must have a substantially true round shape, without distortion therefrom by reason of prior assembly with their caps 27.

FIGS. 3 to 6 show a capsule in accordance with the invention and adapted to be made as illustrated in FIG. 1 and to be filled as illustrated in FIG. 2. The capsule shown in FIG. 3 comprises a body 23 having a generally cylindrical side wall 80 closed at the bottom by a hemispherical end wall 82. The generally cylindrical side wall 80 is slightly tapered to provide necessary draft, and diverges upward to its open upper end 84. The capsule is closed by a cap 27 having a generally cylindrical but slightly tapered and upward-converging side wall 86, closed at the top by an end wall 88 shown as of hemispherical shape.

As shown in FIGS. 4–6, the cap 27 is provided with three inwardly raised lands 90, each extending through approximately 90° of arc circumferentially of the cap, and extending axially of the cap across the junction plane between the side and end walls, from a line 92 of merger with the side wall 86 upward to a line of merger 94 with the hemispherical end wall 88 of the cap. At their lateral edges, the lands 90 are defined by relatively sharp shoulders 96, where the lands rise inward from the walls of the cap. As a result, there are sharply defined depressions or grooves 98 between adjacent lands 90. The grooves are defined at their edges by the inward-standing shoulders 96 and at their bottoms by continuations of the outer side wall 86 of the cap and by adjoining portions of the end wall 88. Each groove shown extends through approximately 30° of arc circumferentially of the cap, and is of progressively increasing depth from its ends toward its mid portion. Its greatest depth will lie at or slightly above the junction plane between the side and end walls.

Desirably, the surfaces of the lands 90 are conical surfaces, with an upward convergence somewhat greater than the draft taper of the side wall 86 of the cap. In one specific embodiment, represented in the drawings, the conical surface of the lands 90 has a taper of the order of 0.2 inch per inch, that is, a reduction in the diameter of 0.2 inch per inch of axial length. This taper is greater than the draft taper of the side wall 86, and the surfaces of the lands 90 lie at a small angle to the surface of the side wall 86, and constitute portions of a conical surface which converges toward the closed end of the cap 27. The maximum difference in elevation between the lands and grooves may be of the order of from .002 inch for size "5" capsules to .005 for size "0" capsules.

The described land and groove configuration of the cap may be produced by suitably forming the pins on which the caps are made. A suitably formed cap pin 116 is shown in FIGS. 7 and 8. This is initially formed in conventional manner, with a generally-cylindrical but draft-tapered side surface 100 which merges at its upper end— at the junction plane indicated by the section line 8—8— with a hemispherical end surface 102. The draft taper may be of the order of 0.010 to 0.020 inch per inch, and in cross section the pin at all points will be circular.

On the conventionally formed pin, three depressions 110 are then formed corresponding with the desired lands 90 of the cap 27. Such depressions have a conical face, coaxial with the pin, converging upward at the slope desired for the inner faces of the lands 90. The edges of the depressions 110 are defined by upstanding shoulders 108 complementary to the shoulders 96 of the lands 90. Between such shoulders 108 the original surface of the pin is left undisturbed to form raised portion 112 standing above the depression 110 to form the grooves 98 of the cap. As shown in FIG. 7, the surfaces of the depressions 110 are straight in the longitudinal direction and extend on opposite sides of the junction plane 8—8 between the side surface 100 and the end surface 102 of the pin 116. In the transverse cross section shown in FIG. 8, it is seen that the surfaces of the depressions 110 are circular in cross section and coaxial with the pin, and that such depressions at their lateral edges are defined by relatively sharp shoulders 108 which stand between the depressions 110 and the undisturbed portions 112 of the original pin surface.

When pins of this configuration are used in the capsule making operation illustrated in FIG. 1, the coating of gelatin on the pin 116 conforms to the configuration of such pin. The depressions 110 produce the inwardly standing lands 90 on the cap 27, the relatively sharp shoulders 108 at the lateral edges of the pin depressions 110 produce the corresponding sharp shoulders 96 at the edges of the lands 90 and the undisturbed pin portions 112 produce the sharply defined grooves 98 in the inner face of the cap. While the internal surface of the cap 27 has sharp shoulders at the lateral edges 96 of the lands 90, the gelatin on the pin tends to fill in the corners by which such sharp shoulders are formed with the result that the cap wall is locally thickened at the edges of the lands 90, and the exterior surface of the cap 27 has a more rounded configuration than the interior surface.

FIGS. 5 and 6 illustrate what occurs as a capsule embodying the invention is assembled—although as indicated earlier, it is difficult to be certain of the theoretical effects which produce the separation resistant results.

FIGS. 4 to 6 show a capsule cap 27 having lands 90 and grooves 98 extending between its draft-tapered side wall 86 and its end wall 88. When the open end 84 of a capsule body 23 is progressively inserted in such cap 27, a small clearance will at first be present between the open body end 84 and the cap side wall 86, because of the downward divergence of the cap side wall 86, and such clearance will get smaller as the insertion movement progresses. If the insertion is at a relatively slow rate, this decreasing clearance may provide sufficient venting of entrapped air to avoid any excessive pressure build-up within the capsule. But when the bodies and caps are assembled on a high speed production machine, such venting may not be sufficient, and air may be trapped under considerable pressure within the assembled capsule, and in a conventional capsule, this may be substantially sealed therein by the relatively tight seal formed between the open end 84 of the body and the closed end of the cap—and will strongly tend to loosen and separate the assembled capsule.

In the capsule of the present invention, as the body 23 moves into the cap 27, the open end 84 of the body engages the lower portions of the lands 90. This engagement will be circumferentially continuous over the extent of the lands 90, but is interrupted at the grooves 98, and such grooves form positive vent openings between the body wall 80 and the cap wall 86. At the time of its first engagement with the lands 90, the body end portion 84 will be substantially undistorted and circular in cross section. As the engagement progresses, however, the land-engaged portions of the body wall will be wedged inward by the sloping lands 90. The wedging action will be circumferentially interrupted at the grooves 98, with the result that the body wall portions opposite the grooves will bulge outward into the grooves 98. As shown in FIG. 6, this bulging action pushes the body wall against the groove wall at the center of the groove, but does not completely fill or close the grooves 98, and clearance openings 99 are left in the corners at the shoulders 96 between the grooves 98 and the lands 90. These clearance openings 99 will communicate with the clearance space 89 between the oppositely draft-tapered side walls 80 and 86 of the body and cap. The arrangement will permit a continuous venting of air so that any pressure which may be created by the rapid joining of the bodies and caps in the making or filling apparatus will be dissipated.

The bulging of the body wall into the grooves permits the body wall to yield in distortion as the wedging occurs. Concurrently, distortion and yielding may also occur in the cap wall, as to bend the groove walls inward. The distortion is limited and controlled. Whereas the body wall is bulged outward in the grooves, this action is limited by the depth of the grooves, and the wall is not bulged inward in other areas. On the contrary, the outward convex wall shape is maintained over the widths of the lands. We believe this results from using relatively wide lands, and relatively narrower grooves. The use of three sets of lands and grooves, as shown, is especially advantageous for this purpose, and while two or four sets of lands and grooves give at least some of the benefits of the invention, the desired distortion control is less likely to be obtained with a greater number.

The interengagement of the capsule bodies with the land and groove portions of the caps produces a strong resistance to separation. The controlled distortion, however, has the result of preventing a complete interlock between the caps and bodies, of reducing the severity of the wedging interengagement, of extending it over a greater length and degree of relative movement, of increasing the tolerance variations over which the separation resistance is obtained, and of providing a yielding and resilient quality which will maintain the separation resistance despite physical or dimensional changes from shrinkage and other causes.

The degree of separation resistance produced in the capsules can be varied by controlling the depth to which, or the force with which, the body 23 of the capsule is telescopically moved into the cap 27. If the cap and body of the capsule is strongly forced together, to a maximum depth, a maximum separation resistance will be obtained; while if the cap and body is forced together with a lesser pressure, and to a shorter depth, the separation resistance will be less pronounced and the capsules will more easily separate in a filling operation. In either case, a pronounced separation resistance action will be obtained, and separation tendencies produced by entrapped air will be avoided.

We claim as our invention:

1. A separation-resistant capsule, comprising
   (a) a body having a closed end and a side wall having a generally cylindrical open-end portion,
   (b) a cap having an end wall and a generally cylindrical side wall telescopically received over the open end of the body,
   (c) and a plurality of circumferentially separated lands standing inward from the inner surface of the cap side wall,
   (d) each such land having an inner face in conforming gripping engagement over a substantial circumferential extent with the outer face of the open-end portion of the body side-wall,
   (e) the lands being circumferentially separated by areas in which the gripping engagement between the cap and body is relieved, and
   (f) the inner surfaces of said cap being shaped and disposed to permit the cap to be readily separated axially from a conforming internal support.

2. A separation resistant capsule as defined in claim 1 in which
   (a) the lands are separated by air passage grooves to vent air from within the capsule.

3. A separation-resistant capsule as defined in claim 1, in which
   (a) said lands occupy from about 60% to about 85% of the circumference of the cap.

4. A separation-resistant capsule as defined in claim 1, also comprising
   (a) inwardly open longitudinal grooves in the cap circumferentially between said lands and providing relief areas into which said open-end portion can distort when engaged by said lands.

5. A separation-resistant capsule as defined in claim 4 in which
   (a) the lands are substantially wider than the grooves between them.

6. A separation-resistant capsule as defined in claim 1, in which
   (a) said lands have generally conical inner surfaces converging toward the closed end of the cap.

7. A separation-resistant capsule as defined in claim 6, in which
   (a) the conical land surfaces have a taper of the order of 0.1 to 0.2 inch per inch.

8. A separation-resistant capsule as defined in claim 6, in which
   (a) the cap end wall is rounded and the conical land surfaces extend from a line of merger with the cap side wall to a line of merger with the rounded end wall.

9. A separation-resistant capsule as defined in claim 1, in which
   (a) said lands have generally conical inner surfaces converging toward the closed end of the cap and are circumferentially separated by inwardly open longitudinal grooves,
   (b) and said lands are from two to four in number and occupy from 60% to 85% of the circumference of the cap.

10. A separation-resistant capsule as defined in claim 9, in which
    (a) said lands stand inward a maximum height of the order of 1% to 2% of the diameter of the cap.

11. A separation-resistant capsule, comprising,
    (a) a body having a closed end, an open end, and a side-wall of circular cross section which diverges slightly adjacent its open end,
    (b) a cap having a rounded end wall and a side-wall portion adapted to be telescopically received over and surround said body side-wall and which has a slight divergence opposite to that of said body side-wall, whereby the divergent side-wall portions of the cap and body define a clearance space of increasing area toward the open end of the cap,
    (c) said cap having an intermediate wall portion between said rounded end wall and said divergent side-wall portion and forming a tapered seat for gripping engagement with the open-end portion of the body side-wall,
    (d) said seat having wide circumferentially-continuous face portions shaped for conforming engagement with the open end portion of the body side-wall, and being interrupted by a plurality of longitudinal grooves extending from inwardly beyond the open end of the body side-wall to a point of communication with said clearance space.

12. A separation-resistant capsule, comprising
    (a) a body having a closed end and an open end defined by a generally cylindrical side-wall,
    (b) and a cap having a rounded end wall and a side wall adapted to be telescopically received over the open end of the body,
    (c) said cap side-wall defining an inner tapered seat for gripping engagement with the open-end portion of the body side-wall and being spaced from the body outward beyond its area of gripping engagement to provide air-venting clearance between the outward portions of the cap and body side-walls,
    (d) said seat having wide circumferentially-continuous face portions shaped for conforming engagement with the open end portion of the body side-wall, and being interrupted by a plurality of longitudinal grooves extending from inward beyond the open end of the body, across said seat, and into communication with said outward clearance.

13. A separation-resistant capsule, comprising
    (a) a body having a closed end and an open end defined by a generally cylindrical side-wall,
    (b) and a cap having a rounded end wall and a side-wall adapted to be telescopically received over the open end of the body,
    (c) said cap side-wall defining a tapered seat for gripping engagement with the open-end portion of the body side-wall,
    (d) said seat having wide circumferentially continuous face portions shaped for conforming engagement with the open end portion of the body side-wall, and being circumferentially interrupted by a plurality of wide grooves into which said open-end portion of the body side-wall is distorted when wedged into said tapered seat.

14. A separation-resistant capsule as defined in claim 13, in which
 (a) the grooves have a shallow depth to limit the outward distortion of the body walls and each has a circumferential width at least of the order of 20° and is flanked by circumferentially wider seat portions.

15. A separation-resistant capsule as defined in claim 13 in which (a) said grooves are laterally defined by shoulders of a configuration to prevent complete closure thereof by the distorted body side-wall.

References Cited in the file of this patent
UNITED STATES PATENTS

| | | |
|---|---|---|
| 525,845 | Hobbs | Sept. 11, 1894 |
| 1,079,438 | Pollock | Nov. 25, 1913 |
| 2,529,424 | Seigh | Nov. 7, 1950 |
| 2,790,576 | Lawrence | Apr. 30, 1957 |